Nov. 15, 1966  D. C. LARKIN  3,285,398
LITTER AND TISSUE BOX CONTAINER
Filed Feb. 25, 1965
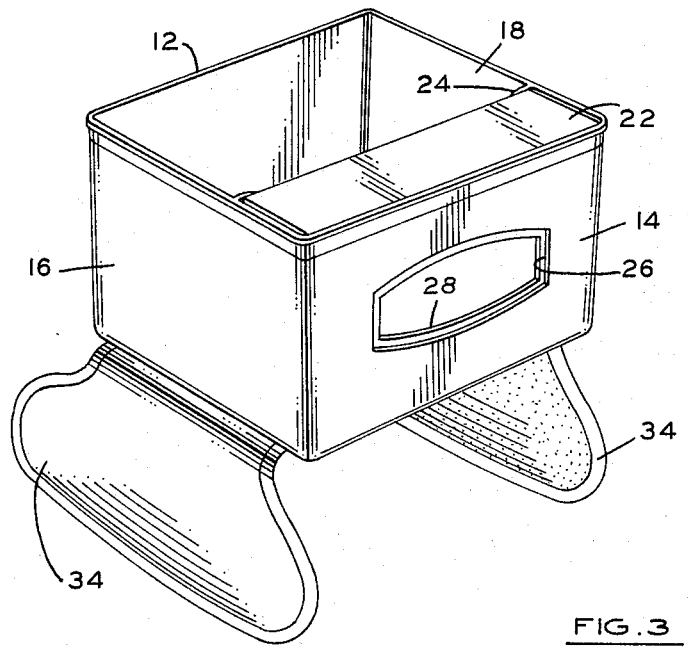
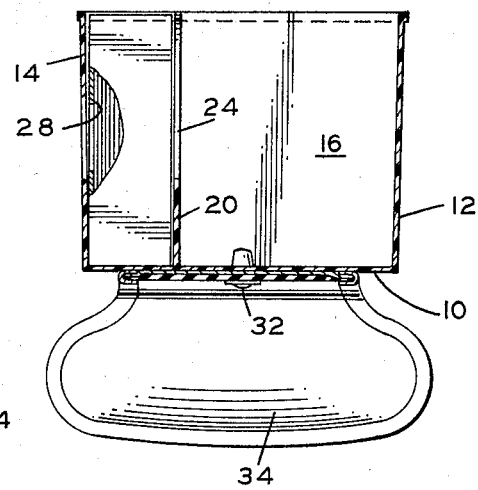
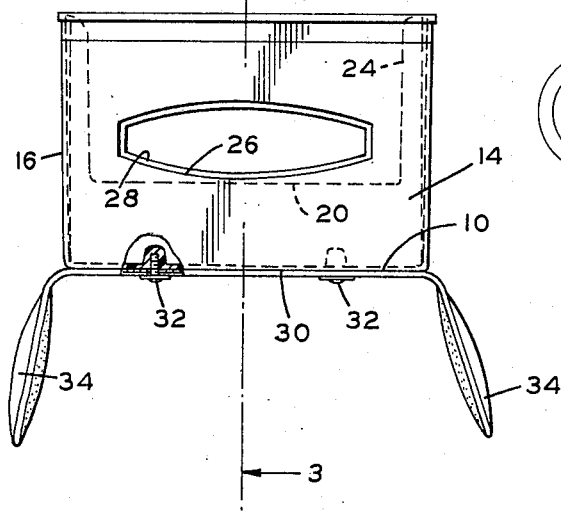
INVENTOR.
DANIEL C. LARKIN
BY
*Burton & Parker*
ATTORNEYS United States Patent Office 3,285,398
Patented Nov. 15, 1966

3,285,398
LITTER AND TISSUE BOX CONTAINER
Daniel Charles Larkin, 3134 Woodstock Drive,
Detroit, Mich.
Filed Feb. 25, 1965, Ser. No. 435,134
3 Claims. (Cl. 206—19.5)

This invention relates to a litter and cleansing tissue container for use primarily in the interior of an automobile body.

The container is of such a character that it may be used in other places than within the interior of a motor car but it is particularly adapted for automobile use. It is provided with a saddle pad element secured to its bottom wall and being of an elongate character and having end portions that extend beyond the opposed side walls of the container and which end portions are flexible and weighted so that they will drape downwardly from the bottom of the container to closely hug the top and side walls of the tunnel hump which is a feature of most automobile bodies, whereby the container may sit upon such tunnel hump closely adjacent to the passenger front or rear set of a motor car.

The saddle pad element is provided on its exposed bottom surface with a material such as sponge rubber or the like which frictionally engages the tunnel hump so as to maintain its position thereupon during travel of the car over the road.

Heretofore litter baskets of this character have been provided as disclosed in applicant's U.S. Patent No. 3,109,537. Cleansing tissue box containers have also been provided to seat similarly upon the tunnel hump of a motor car. The object of this invention is to combine in one structure a container which not only serves the purpose of a litter basket but also serves to carry a cleansing tissue containing box. The improved container of this application is so constructed that there is one compartment adapted to receive litter and another compartment adapted to receive and support a tissue containing box in such a manner that tissues may be extracted therefrom without removing the box from the compartment. The container is also so constructed that it serves both purposes and still is of small size and presents an attractive appearance, and the cleansing tissue is kept within the box in such a manner that while accessible for use it is not exposed in an untidy manner.

A further object is the provision of a container of the character described which not only will receive and support the tissue containing box but permits the same to be readily grasped for removal and replacement and wherein the two compartments are provided within the interior of the container by a partition which is so disposed as to snugly support the tissue containing box against that side wall of the container which is provided with a finger opening rendering the contents of the tissue containing box readily accessible.

Other objects, advantages, and meritorious features will more fully appear from the specification, claims, and accompanying drawings, wherein:

FIG. 1 is a perspective of my improved litter and cleansing tissue container;

FIG. 2 is a side elevation of the container partially broken away to show the means of securing a saddle pad element to the bottom of the container; and FIG. 3 is a vertical sectional view through the container shown in FIG. 2.

The container itself may be formed of plastic, metal or other suitable material and is of a generally rectangular shape, being provided with a bottom wall 10 and two opposite side walls 12 and 14 and two opposite end walls 16 and 18 and being open at the top. The interior of the container is divided by partition 20 into a large compartment adapted to receive litter or refuse and a small compartment adapted to receive a cleansing tissue containing box such as is indicated by the numeral 22.

The partition is cut away as indicated by the dotted line 24 in FIG. 2 or as shown at 24 in FIG. 3. Such cut-away opening renders the cleansing tissue containing box readily accessible for removal in order that such may be replaced. The bottom portion of the small compartment may be used to carry small coins which would be readily accessible for the driver for use in meter boxes or in the payment of highway tolls.

The side wall 14 of the container which is that side wall adjacent to the small compartment, is provided with a finger opening 26. This finger opening 26 is adjacent to a finger opening 28 which is formed in the tissue containing box 22, as shown in FIG. 3, so that one may readily withdraw cleansing tissues through the opening 26 from the tissue containing box 22. Following use such tissue may be deposited in the litter compartment.

As illustrated the small compartment of the container which carries the tissue containing box may be disposed adjacent to the passenger seat of the motor car for convenience in removal of tissues and the apertured side wall of the box is one of the long side walls of the container.

The saddle pad assembly is of an elongate character and its mid portion 30 is secured to the bottom 10 of the container by screws 32 or the like as shown in FIG. 2. This saddle pad assembly is formed of a flexible material such as plastic or artificial leather and the end portions 34 are hollow bag-like portions and contain loose weighted material such as sand or the like.

The underside of the saddle pad assembly comprises a material such as sponge rubber which is of a highly frictional character and will frictionally engage the top and side walls of the tunnel hump of a motor vehicle body so as to maintain the container seated thereupon. The saddle pad assembly is sufficiently flexible so that the weighted end portions would cause the same to drape over the top of the tunnel hump as well as its side walls hanging from the bottom of the container along a line approximating the position of the securing screws thereby increasing the frictional surface area. The frictional engagement of the saddle pad with top and sides of the tunnel hump is further increased by the fact that the end portions of this saddle pad assembly are of an increased width so that such are of as great or greater width than the sides of the container itself from which they depend.

What I claim is:

1. A litter and cleansing tissue container for use in the interior of a motor vehicle comprising, in combination, a container having a bottom and four sides and open at the top, an elongate saddle-like pad secured intermediate its ends to the bottom of the container and having opposed end portions extending sufficiently beyond opposite sides of the container and being flexible and weighted so as to drape downwardly away from the bottom of the container over the top and opposite sides of the tunnel hump of an automobile body when the container is seated upon said hump, said saddle pad provided on its underside with a material of a sponge rubber-like frictional character, the interior of the container divided into two compartments, a litter containing compartment and a tissue containing compartment, by an upright integral partition spaced from one side wall of the container which side wall is provided with a finger opening therethrough, said tissue compartment adjacent to the side wall having the finger opening receiving and supporting a tissue containing box therein, which box has a finger opening through its side wall disposed to communicate with the finger opening through the side wall of the container.

2. A litter and cleansing tissue container as defined in claim numbered 1 characterized in that the partition within the container is cut away at its opposite ends spaced from the side walls of the container and spaced above the bottom wall of the container exposing the adjacent side wall of the tissue containing box to the interior of the litter containing compartment.

3. A litter and cleansing tissue container for use in the interior of a motor vehicle comprising, in combination, a container having a bottom and four sides and open at the top, one of said sides provided with a finger opening therethrough, an upright partition spaced from said one side wall dividing the interior of the container into two compartments, a litter containing compartment and a tissue containing compartment, said tissue compartment adjacent to the side wall having the finger opening therethrough receiving and supporting a tissue containing box therein, which box has a finger opening through its side wall disposed to communicate with the finger opening through the side wall of the container, said partition being cut away at its opposite ends spaced from the side walls of the container and spaced above the bottom of the container exposing the adjacent side wall of the tissue containing box to the interior of the litter containing compartment, an elongate saddle-like pad secured intermediate its ends to the bottom of the container spaced inwardly from opposite sides of the container and extending lengthwise in a direction parallel to said partition, said saddle pad having opposed end portions of a width at least as great as the width of the side walls of the container and extending sufficiently beyond opposite walls of the container and being flexible and weighted so as to drape downwardly away from the bottom of the container over the top and opposite sides of the tunnel hump of a motor vehicle body when the container is seated upon said hump, and said saddle pad provided on its underside with a material of a sponge rubber-like frictional character.

References Cited by the Examiner
UNITED STATES PATENTS

| | | | |
|---|---|---|---|
| 2,482,572 | 9/49 | Avigdor | 312—12 |
| 2,867,248 | 1/59 | Forney. | |
| 2,915,218 | 12/59 | Rosenman | 206—57 X |
| 3,025,760 | 3/62 | Jungjohann | 206—62 X |
| 3,072,245 | 1/63 | Faltin | 206—19.5 |
| 3,141,569 | 7/64 | Hanson | 206—57 X |
| 3,163,287 | 12/64 | Barnett | 206—72 X |
| 3,223,281 | 12/65 | Larkin | 206—19.5 X |

LOUIS G. MANCENE, *Primary Examiner.*